(12) United States Patent
Rozenberg et al.

(10) Patent No.: US 8,332,944 B2
(45) Date of Patent: Dec. 11, 2012

(54) SYSTEM AND METHOD FOR DETECTING NEW MALICIOUS EXECUTABLES, BASED ON DISCOVERING AND MONITORING CHARACTERISTIC SYSTEM CALL SEQUENCES

(76) Inventors: Boris Rozenberg, Beer Sheva (IL); Ehud Gudes, Beer Sheva (IL); Yuval Elovici, Moshav Arugot (IL)

( * ) Notice: Subject to any disclaimer, the term of this patent is extended or adjusted under 35 U.S.C. 154(b) by 376 days.

(21) Appl. No.: 12/697,559

(22) Filed: Feb. 1, 2010

(65) Prior Publication Data
US 2010/0229239 A1    Sep. 9, 2010

(30) Foreign Application Priority Data
Mar. 8, 2009    (IL) .......................................... 197477

(51) Int. Cl.
*G06F 12/14*    (2006.01)
(52) U.S. Cl. .......................................... 726/24; 713/188
(58) Field of Classification Search .............. 726/22–24; 713/187–189
See application file for complete search history.

(56) References Cited

U.S. PATENT DOCUMENTS

| | | | | |
|---|---|---|---|---|
| 6,775,780 | B1 * | 8/2004 | Muttik | 726/24 |
| 7,072,876 | B1 * | 7/2006 | Michael | 706/45 |
| 8,037,535 | B2 * | 10/2011 | Maloof | 726/24 |
| 8,205,256 | B2 * | 6/2012 | Ahn et al. | 726/22 |
| 2003/0065926 | A1 * | 4/2003 | Schultz et al. | 713/188 |
| 2004/0255163 | A1 * | 12/2004 | Swimmer et al. | 713/201 |
| 2005/0283838 | A1 * | 12/2005 | Saito | 726/24 |
| 2006/0037080 | A1 * | 2/2006 | Maloof | 726/24 |
| 2007/0239999 | A1 * | 10/2007 | Honig et al. | 713/194 |
| 2008/0120720 | A1 | 5/2008 | Guo et al. | |

OTHER PUBLICATIONS

S. Forrest., "A sense of Self . . . " Proceeding of the IEEE Symposium on Security and Privacy, CA, 9 Pages, 1996.
W. Lee et al., "Learning Patters . . . " AAAI Workshop on AI Approaches to Fraud Detection and Risk Managment, 7 Pages, AAAI Press Jul. 1997.
W. Lee et al., "Data Mining . . . Intrusion Detection" Proceedings of the 7th Usenix Security Symposium, 16 Pages 1998.
Lee, W. et al: "Mining audit data . . . models" Proceedings 4th internat'l conf on knowledge discovery & data mining 1998, pp. 66-72, XP007912921.
S. Forrest., Proceeding of the IEEE Symposium on Security and Privacy, CA, pp. 120-128, 1996.
W. Lee et al., AAAI Workshop on AI Approaches to Fraud Detection and Risk Managment, pp. 50-60, AAAI Press Jul. 1997.
W. Lee et al., Proceedings of the 7th Usenix Security Symposium' 1998.

(Continued)

*Primary Examiner* — Saleh Najjar
*Assistant Examiner* — Eric W Shepperd
(74) *Attorney, Agent, or Firm* — Roach Brown McCarthy & Gruber, P.C.; Kevin D. McCarthy

(57) ABSTRACT

The invention relates to a method for detecting malicious executables, which comprises: in an offline training phase, finding a collection of system call sequences that are characteristic only to malicious files, when such malicious files are executed, and storing said sequences in a database; and, in runtime, for each running executable, continuously monitoring its issued run-time system calls and comparing with the stored sequences of system calls within the database to determine whether there exists a match between a portion of the sequence of the run-time system calls and one or more of the database sequences, and when such a match is found, declaring said executable as malicious.

2 Claims, 2 Drawing Sheets

OTHER PUBLICATIONS

T. Lee et al., "Behavioral Classification" Presented at the EICAR Conference, 2006.
K. Beyer et al., Proc. 7th Int. Conf. on Database Theory (ICDT 99), pp. 217-235, 1999.
Zaki, M.: "Spade: An efficient algorithm . . . sequences"; Machine Learning, vol. 42, No. 1-2, Jan. 2001, pp. 31-60, XP002581024.
Forrest, S. et al: "Evolution of System-Call Monitoring" Computer Security Applications conference, Dec. 8, 2008, pp. 418-430, XP031376795.
European Search report for corresponding EP application—8 pages—mailed on Jun. 10, 2010.

* cited by examiner

SYSTEM AND METHOD FOR DETECTING NEW MALICIOUS EXECUTABLES, BASED ON DISCOVERING AND MONITORING CHARACTERISTIC SYSTEM CALL SEQUENCES

FIELD OF THE INVENTION

The field of the invention relates to systems for detecting malicious executables. More particularly, the present invention relates to a system and method for detecting malicious executables, based on the use of a database of system call sequences that are characteristic only to malicious executables.

BACKGROUND OF THE INVENTION

Malicious executables (or malware) which propagate through the Internet can be classified into three main categories: (a) worm-related; (b) non-worm related (i.e. virus, Trojan); and (c) probes (i.e. adware, spyware, spam, phishing). The detection of malicious executables that are known beforehand is typically performed using signature-based techniques. Said signature-based techniques typically rely on the prior explicit knowledge of the malicious executable code, which is in turn represented by one or more signatures or rules that are stored in a database. According to said prior art techniques, the database is frequently updated with new signatures, based on new observations. The main disadvantage of these techniques is the inability to detect totally new un-encountered malicious executables, (i.e. malicious executables whose signatures are not yet stored in the database).

An object of the present invention is to provide a technique which can detect new malicious executables, whose signatures are unknown yet. There are two main prior art approaches for performing such a task: (a) static analysis of executables; and (b) dynamic analysis of executables.

The static analysis approach suggests an inspection of the code of executables without actually running them, while the dynamic analysis approach suggests monitoring during the execution phase of the executable in order to detect anomaly behavior.

The present invention suggests a new technique of the dynamic analysis approach for the detection of new, unknown malicious executables.

Traditionally, anomaly detection techniques that are based on dynamic analysis approach have been used to detect new electronic threats (eThreats). These techniques build models of a normal program behavior during a training phase, and then, using the models the techniques attempt to detect deviations from said normal behavior during a detection phase. For example, S. Forrest, "A Sense of Self for UNIX Processes", Proceedings of the IEEE Symposium on Security and Privacy, Oakland, Calif. 120-128, 1996, introduces a simple anomaly detection technique which is based on monitoring the system calls issued by specific privileged processes. During a training phase, the system of Forrest records short sequences of system calls that represent a normal process behavior into a "normal dictionary". During a detection phase which is performed later, sequences of actual system calls are compared with said normal dictionary. An alarm is issued if no match is found.

Several data mining techniques for studying system call sequences have been proposed so far. W. Lee, S. J. Stolfo, and P. K. Chan, "Learning patterns from UNIX process execution traces for intrusion detection", AAAI Workshop on AI Approaches to Fraud Detection and Risk Management, pages 50-56, AAAI Press, July 1997, and W. Lee and S. J. Stolfo, "Data mining approaches for intrusion detection", Proceedings of the 7th USENIX Security Symposium, 1998, propose a method for describing "normal" system call sequences by means of a generally small set of rules, wherein the rules cover common elements in those sequences. During real time detection, sequences that are found to violate the rules are considered as anomalies.

The main advantage of said anomaly detection techniques is their ability to detect new, previously un-encountered malicious codes. The main drawback of using these techniques is the necessity to perform a complex and frequent retraining in order to separate "noise" and natural changes to programs from malicious codes. Legitimate program updates may result in false alarms, while malicious code actions that seem to be normal may cause missed detections. Furthermore, most applications that are based on anomaly detection techniques identify malicious behavior of specific processes only.

Another technique which is based on dynamic analysis approach has been proposed in T. Lee, Jigar J. Mody, "Behavioral Classification" Presented at the EICAR Conference, May 2006. Lee and Jigar propose a malicious code classification technique which is based on clustering of system call sequences. In the technique proposed by Lee and Jigar, malicious programs of various classes are represented as sequences of system calls. A K-medoid Clustering algorithm, as described in L. Kaufman and P. J. Rousseeuw, "Finding groups in data: An introduction to cluster analysis, New York: John Wiley & Sons. 1990 is applied to the sequences in order to map the input into a predefined number of different classes. The distance threshold between sequences is defined by as the minimum "cost" required in order to transform one sequence of system calls to another sequence of system calls, by applying a set of predefined operations. The process of Lee and Jigar results in a classifier, which includes plurality of medoids, wherein each medoid is a best representative of each cluster. The classification of new objects is performed using the nearest neighbor classification method as described in K. Beyer, J. Goldstein, R. Ramakhrisnan, and U. Shaft, "When is 'nearest neighbor' meaningful?", Proc. 7th Int. Conf. on Database Theory (ICDT'99), pages 217-235, 1999. A new object is compared to all medoids, and receives a class label of the closest one.

The technique above can be used to classify a given malicious code instance as belonging to one of the predefined number of classes, but cannot be used for a new malicious code detection in real time.

It is therefore an object of the present invention to provide a general, real time detection method and system that is more reliable than prior art methods and systems.

It is still another object of the invention to provide a method which can detect a new malicious code in any executable, and not only in specific previously known programs.

Other objects and advantages will become apparent as the description proceeds.

SUMMARY OF THE INVENTION

The present invention relates to a method for detecting malicious executables, which comprises the steps of: (a) in an offline training phase, finding a collection of system call sequences that are characteristic only to malicious files, when such malicious files are executed, and storing said sequences in a database; (b) in runtime, for each running executable, continuously monitoring its issued run-time system calls and comparing with the stored sequences of system calls within the database to determine whether there exists a match between a portion of the sequence of the run-time system calls and one or more of the database sequences, and when such a match is found, declaring said executable as malicious.

Preferably, each of said system call sequences that are determined during the training phase includes zero or more wildcards, wherein each wildcard defines the existence of zero or more system calls of any undefined type at the location of the wild card within the sequence.

In an embodiment of the invention, said training phase comprises the steps of: (a) providing an $M_r$ dataset which comprises recordings of as many as possible system call sequences of malicious executables, and a $B_r$ dataset which comprises recordings of as many as possible system call sequences of benign executables; (b) for a specific support value, and using a SPADE algorithm, finding a set S of system call sequences, each of said sequences is repeated within some group equal or larger than the support value from among all the system call sequences within the malicious recordings in dataset $M_r$; (c) for each of the sequences found within set S, determining whether it is found within any of the recordings within the dataset $B_r$, and forming a reduced dataset $S_m$ which contains only those sequences that are not included within any of the recorded sequences within benign dataset $B_r$; (d) Adding $S_m$ into database M, and eliminating from dataset $M_r$ all the recordings which have been found to contain any one or more of the sequences of $S_m$; (e) If, however, dataset $S_m$ is found in step (c) to be empty, reducing the support value, and repeating the procedure from step (b); and (f) Continuing the procedure from step (b) until either the support value is equal to zero, or the dataset $M_r$ is empty, therefore finalizing the procedure with a dataset M containing a group of sequences that each appears within one or more of the run-time sequences of malicious executables, but does not appear within any of the run-time sequences of benign executables.

DETAILED DESCRIPTION OF PREFERRED EMBODIMENTS

The present invention introduces a novel technique for the real-time detection of new malicious executables. According to the present invention, instead of looking for anomalies, or trying to separate between malicious and benign behavior of executables, the present invention finds "behavior signatures" (i.e. sequences of system calls) that are characteristic to malicious executables and not to benign executables. The invention utilizes the observation by the inventors that specific sequences of system calls are characteristic each to only a group of malicious executables while not characteristic to any benign executable. The present invention determines and assigns sequences of system calls as representing the behavior of a malicious program. This is performed during a learning/training phase. During a detection phase, which is performed in run time (i.e. after said learning/training phase), the invention identifies malicious executables by comparing their own run time sequences of system calls with said stored (in the database) sequences of system calls that are characteristic to only malicious executables. As will be demonstrated hereinafter, the present invention, in a first aspect, detects malicious objects by (a) determining during a training phase a group of system calls sequences that are characteristic only to malicious executables, and storing all said sequences in a database; (b) monitoring in runtime the system calls relating to each running executable, and comparing the same in real time with said database of malicious of sequences of system calls; and (c) if a match is found between a monitored sequence and one or more of the sequences that are stored within the "malicious" database, declaring the monitored executable as malicious.

A first aspect of the invention relates to the phase of forming the database M which, as said, includes the sequences that are characteristic only to malicious executables. This phase will be referred to also as the training phase. A second aspect of the invention relates to the run-time phase, which utilizes the database M for determining whether a running executable is malicious or not.

Figure 1:
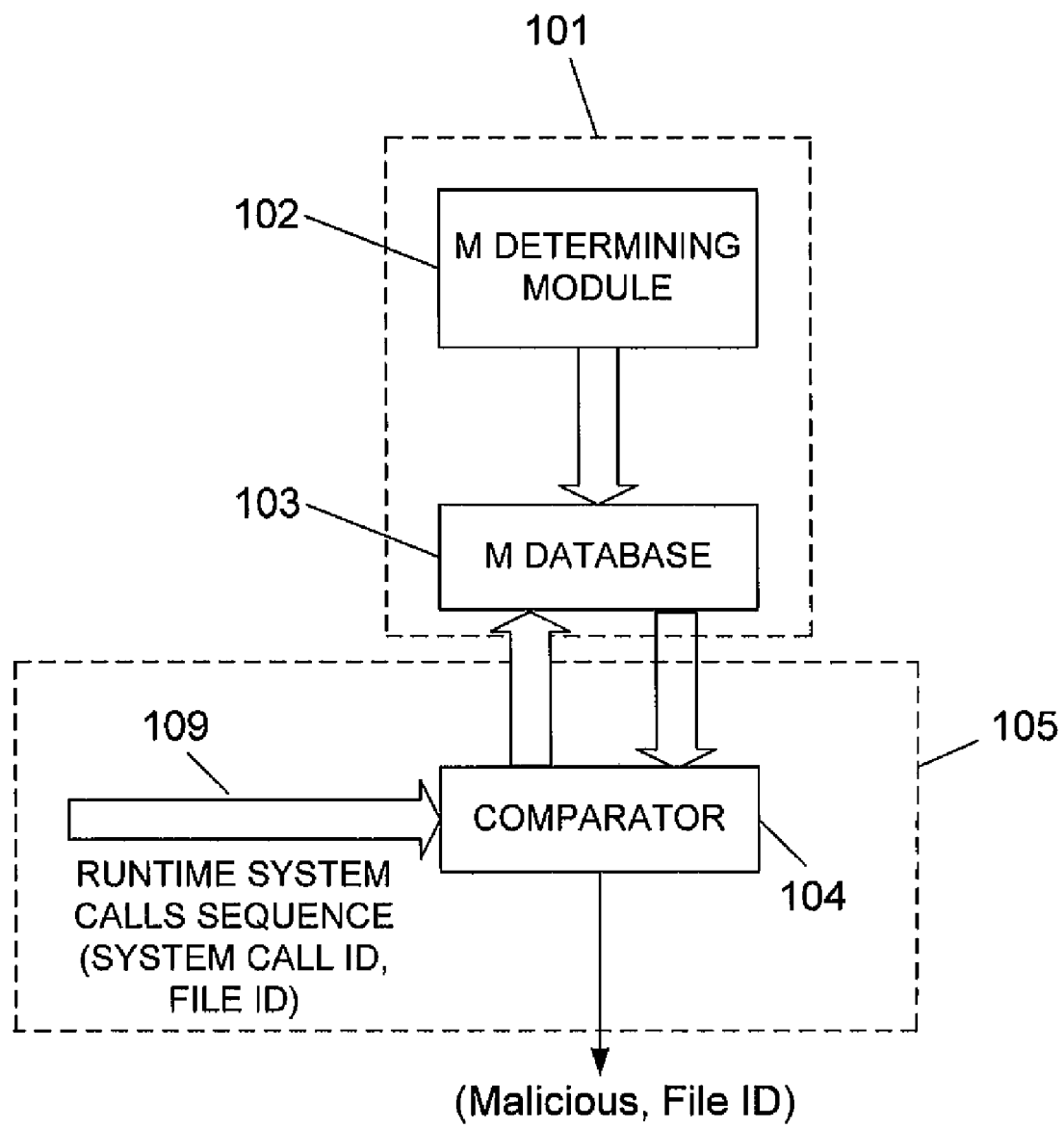
FIG. 1 illustrates the method for detecting malicious executables, as performed in runtime, according to an embodiment of the present invention.

FIG. 1 is a flow diagram illustrating the process for detecting malicious executables according to said first aspect of the present invention. Training phase 101 is a preliminary phase, which is performed off-line. During the training phase an "M determining module" 102 operates to determine as many as possible characteristic M-sequences of system calls that are characteristic only to malicious executables, and not to any benign program. It should be noted that each found M-sequence generally relates to a group of existing malicious executables. Said M determining module 102 produces an "M database" 103 which includes the collection of M-sequences, as determined. The M database 103 forms an input data to comparator 104 which operates in runtime, or more particularly, it is a part of runtime monitoring phase 105. During the runtime monitoring phase 105, comparator 104 continuously receives inputs relating to the system calls that are issued by the currently running executables. More specifically, comparator 104 receives over input bus 109 for each issued system call the system call ID and the file ID (i.e. an indication regarding to the executable that issued said specific system call). Comparator 104, which has an access to M database 103, compares separately for each running program in real time the sequence of system calls 109 that it issues, with each of the sequences stored in the M database, that are characteristic only to malicious executables. If with respect to a specific running program a match is found with one or more of the M-sequences, comparator 104 outputs such an indication (for example, in a form of Malicious, File ID), and this specific executable is declared as malicious and can be terminated. Otherwise, as long as no such an alert signal is issued, this running file is considered as benign.

Figure 2:
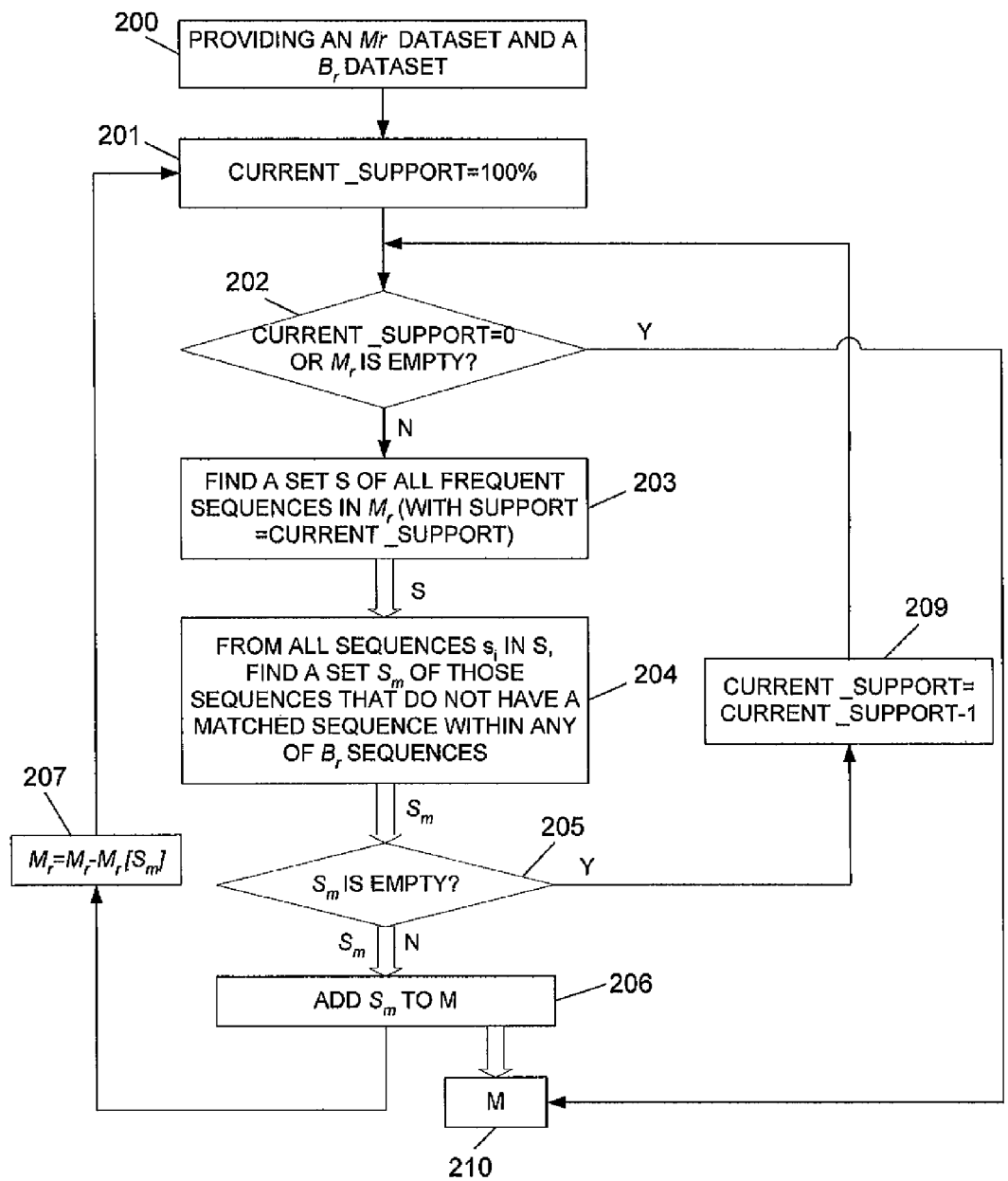
FIG. 2 illustrates a training procedure which is performed off-line, prior to the performance of the run-time procedure of FIG. 1, and which determines a set of system call sequences that are characteristic only to malicious executables and not to any benign executable.

As is known, presently there are about 1100 different system calls for WINDOWS operating systems. According to the present invention each of the M-sequences of system calls comprises two or more system calls that appear successively or not. Each M-sequence may therefore include wildcards that are indicated by (*). A wildcard that appears within a sequence indicates any number (one or more of unidentified system calls. Just for the sake of convenience of explanations, the various system calls will be indicated herein by one of the letters a-z. Of course, the a-z indications do not represent all of the approximately 1100 existing system calls, but for the sake of the present explanation a reference to only 26 different system calls (as represented by the letters a-z) suffice. The following are only some examples for possible M-sequences of system calls within the M-database 103:

a. ab*c*dft*wsyp;
b. fgew*uyojf*qlu;
c. fg*rt*y*uopegh*edf*w;
d. ajkeub;
e. etc, FIG. 2 describes a training phase process for determining the database of M-sequences, according to one aspect of the invention. The process comprises accumulation of as many as possible (for example 50,000) executables that are known to be malicious, and as many as possible (for example 70,000) executables that are known to be benign. At the first stage, each of said benign and malicious executables are activated (i.e. executed), and some selected run-time sequence of system calls is recorded for each of said executables. The result are two datasets, $M_r$ dataset which therefore (according to this example) contains about 50,000 different $M_{r(1-n)}$ records of "raw" sequences relating respectively to the 50,000 (n=50,000) malicious executables, and $B_r$ dataset which similarly contains about 70,000 different records of "raw" sequences $B_{r(1-m)}$ relating respectively to the 70,000 (m=70,000) benign executables. The length of each of said n and m sequence records (within $M_r$ and $B_r$) is relatively long (for example, between 100 and 10000 system calls. For example, said "raw" sequences of system calls may be recorded during about 5 seconds in which the respective benign or malicious file is run. During this exemplary 5 seconds period, a running file typically issues between 100 to 10,000 system calls. It should be noted that there is no necessity for having a same sequence length for all the various "raw" recorded sequences within either $M_r$ and/or $B_r$ datasets. As mentioned, the results of the training phase are a database M of $M_{1-q}$, sequences that are each characteristic only to some group G of malicious files but not to any of the benign files. The lengths of the various $M_{1-q}$, sequences are not necessary identical, and each of said sequences may comprise zero or more wild cards.

A flow diagram for finding the $M_{1-q}$ sequences, i.e., those which are characteristic only to malicious executables, is shown in FIG. 2.

Initially, in step 200 the $M_r$ and the $B_r$ datasets of "raw" malicious and benign sequences respectively are provided. As said each of said datasets includes as many as possible recorded "raw" sequences of system calls of executables that are known to be malicious (in the $M_r$ dataset) and benign (in the $B_r$ dataset) respectively. Next, in step 201, an initial support value—CurrSupp is set to 100%. The term "support" relates to the percent of files within the M.sub.r dataset in which a certain specific sequence of system calls is present. For example, the use of a support value of 76% indicates that the process looks for specific sequences of system calls that appears in at least in 76% of the files whose "raw" sequences appear within the $M_r$ dataset. Therefore, the term Current_Support defines a presently used support value. In step 202, a check is made to determine whether the Current_Support is zero, or whether the dataset $M_r$ is empty. If one or more of said two conditions of step 202 is met, the process ends with step 210 in which database M contains a collection of system call sequences that are characteristic to only malicious files (and not to benign files). Otherwise, if none of the two conditions are met in step 202, the procedure continues to step 203. In step 203, a set S of all sequences in Mr having a support=Current_Support is determined. For example, if the Current_Support=76%, the procedure finds all the sequences that repeat within 76% or more of the raw sequences of dataset $M_r$. Step 203 may apply the SPADE algorithm as described in M. G. Zaki, "SPADE: An Efficient Algorithm for Mining Frequent Sequences", Machine Learning, 42, 31-60, 2001, or any other suitable algorithm. SPADE is an algorithm for fast mining of sequential patterns in large databases. Given a database and a minimal support value (in the present case Current_Support), SPADE efficiently generates all sequences that repeat (i.e. frequent) in the database with a support equal to or greater than Current_Support. It should be noted that each s.sub.i in the found sequences S may contain one or more wildcards. In step 204, for each sequence si in S the process checks whether the sequence $s_i$ appears within any of the sequences included within the dataset $B_r$, which as said contains raw sequences of benign executables. If it is found in step 204 that a sequence $s_i$ appears within one or more of the raw sequences within the $B_r$ dataset, that means that $s_i$ is not a suitable sequence for the purpose of determining malicious executables according to the invention, as it is not characteristic only malicious executables. The output from step 204 is therefore a reduced set $S_m$, which includes only those sequences from S that do not appear in any of the sequences of $B_r$, and therefore are characteristic to only malicious executables. If the $S_m$ is NULL (i.e. contains no sequence), the process continues to step 209, in which the Current_Support is reduced by 1, and the procedure returns to step 202. If, on the other hand in 205 it is found that the set $S_m$ contains one or more sequences, those sequences are added in step 206 into the database M. Then, in step 207 all the raw sequences from data set M for which a match has been found within one or more of the $S_m$ sequences (i.e. those raw sequences of $M_r$ which contain one or more of sequences in $S_m$) are eliminated from the dataset $M_r$ and the procedure continues in step 201. In step 201, the Current_Support is again set to 100%, however, in this case the 100% now relates only to the those sequences that remained within $M_r$ after the sequences elimination of step 207. Therefore, the procedure repeats until it is found in step 202 that the Current_Support is equal to 0, or that $M_r$ is empty. The result of the completion of the procedure of FIG. 2 is the database M, which contains a collection of sequences of system calls that are characteristic to only malicious executables and never appear during real time execution of benign files.

More specifically, the process of FIG. 2, as described above repeats until exhausting all the executables within the database $M_r$. Therefore, at the end of this process, a database M which includes plurality of sequences $s_1$-$s_y$ is formed, wherein each of said sequences is characteristic to a corresponding group G of malicious executables, but not to any benign executable. Said database M, including all said found sequences $s_1$-$s_y$ is used in runtime for detecting malicious executables, in a manner as described above with respect to FIG. 1.

It should be noted that the process of the present invention, as described above, enables the detection of all, or at least most of malicious executables that are entirely new, and that are not known beforehand, as it is assumed that their behavior introduces one of the sequences of system calls within the database M.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for detecting malicious executables, which comprises:
   (a) creating, in an offline training phase, a database M of system call sequences that are characteristic only to malicious files, when the malicious files are executed, and storing said system call sequences in the database M; and
   (b) continuously monitoring in runtime, for each running executable, issued run-time system calls of each running executable and comparing with the system call sequences within the database M to determine whether there exists a match between a portion of a system call sequence of the issued run-time system calls and one or more of the system call sequences in the database M, and when the match is found, declaring said running executable as malicious;
   wherein said training phase comprises:
   (c) providing an $M_r$ dataset which comprises recordings of system call sequences of malicious executables, and a $B_r$ dataset which comprises recordings of system call sequences of benign executables;
   (d) finding, using a Sequential Pattern Discovery using Equivalence classes (SPADE) algorithm, a set S of system call sequences for a specific support value, wherein the specific support value corresponds to a percentage value of recordings of system call sequences of malicious executable within the $M_r$ dataset, in which recordings of system call sequences of malicious executables a given sequence of system calls is present, wherein each system call sequence of said set S is repeated within some group of recordings of system call sequences of malicious executables in the $M_r$ dataset equal to or larger than the specific support value from among all the system call sequences of the recordings of system call sequences of malicious executables in dataset $M_r$;
   (e) determining, for each of the system call sequences of set S, whether the system call sequence of set S is found within any of the recordings within the dataset $B_r$, and forming a reduced dataset $S_m$ which contains only system call sequences of set S that are not included within any of the recordings of system call sequences of benign executables in dataset $B_r$;
   (f) adding dataset $S_m$ into database M, and eliminating from dataset $M_r$ all recordings which have been found to contain any one or more of the system call sequences of dataset $S_m$;
   (g) when dataset $S_m$ is found in step (e) to be empty, reducing the specific support value, and repeating step (d); and
   (h) continuing step (d) until either the specific support value is equal to zero, or the dataset $M_r$ is empty, therefore finalizing the procedure with a database M containing a group of system call sequences that each appears within one or more of the system call sequences of malicious executables, but does not appear within any of the system call sequences of benign executables.

2. A method according to claim 1, wherein each of said system call sequences of the database M, includes zero or more wildcards, wherein each wildcard defines the existence of zero or more system calls of any undefined type at the location of the wild card within the system call sequence.

* * * * *